United States Patent
Owen

(10) Patent No.: US 9,915,817 B2
(45) Date of Patent: Mar. 13, 2018

(54) PERISCOPE WITH A REFLECTOR FORMING A LIGHT TIGHT SEAL

(71) Applicant: Kent Periscope Ltd, Denbighshire (GB)

(72) Inventor: Gary Owen, Gwynedd (GB)

(73) Assignee: Kent Periscopes Ltd, Denbighshire (GB)

( * ) Notice: Subject to any disclaimer, the term of this patent is extended or adjusted under 35 U.S.C. 154(b) by 0 days.

(21) Appl. No.: 14/916,012

(22) PCT Filed: Oct. 29, 2014

(86) PCT No.: PCT/GB2014/053217
§ 371 (c)(1),
(2) Date: Mar. 2, 2016

(87) PCT Pub. No.: WO2015/063480
PCT Pub. Date: May 7, 2015

(65) Prior Publication Data
US 2016/0202466 A1    Jul. 14, 2016

(30) Foreign Application Priority Data

Oct. 29, 2013 (GB) .................................. 1319089.7
Mar. 12, 2014 (GB) .................................. 1404393.9

(51) Int. Cl.
*G02B 23/08* (2006.01)
*G02B 7/182* (2006.01)
(Continued)

(52) U.S. Cl.
CPC ............. *G02B 23/08* (2013.01); *F41H 5/266* (2013.01); *G02B 7/182* (2013.01); *G02B 7/24* (2013.01)

(58) Field of Classification Search
CPC ........ G02B 23/00; G02B 23/02; G02B 23/08; G02B 23/10; G02B 23/105; B63C 11/49; B63C 11/48; B63G 8/38
(Continued)

(56) References Cited

U.S. PATENT DOCUMENTS 3,165,573 A       1/1965   Moultrie
3,856,383 A  *   12/1974  Yamashita ............. G02B 23/08
                                                    359/509
6,811,265 B2 *  11/2004  Soper ..................... G03B 21/30
                                                    349/6

FOREIGN PATENT DOCUMENTS

DE   10 2008 061701 A1    6/2010
EP     0 459 885 A1       12/1991
(Continued)

OTHER PUBLICATIONS

English translation of specification of DE102008021486.*
(Continued)

*Primary Examiner* — Arnel C Lavarias
(74) *Attorney, Agent, or Firm* — Renner, Otto, Boisselle & Sklar, LLP

(57) ABSTRACT

A periscope includes an object window 4, a first reflector 5, a second reflector 6; and an intermediate port between the first reflector 5 and the second reflector 6. The first reflector 5 is arranged to reflect light from the object window 4 towards the second reflector 6 through the intermediate port. The second reflector 6 is selectively movable between a first position of use in which the second reflector 6 reflects light from the first reflector 5 towards a viewing position and a second position of use in which the second reflector 6 closes the intermediate port.

14 Claims, 2 Drawing Sheets

(51) Int. Cl.
*G02B 7/24* (2006.01)
*F41H 5/26* (2006.01)

(58) Field of Classification Search
USPC ........ 359/362, 399, 402, 403, 404, 405, 406
See application file for complete search history.

(56) References Cited

FOREIGN PATENT DOCUMENTS

| | | | |
|---|---|---|---|
| EP | 0 908 752 A1 | 4/1999 | |
| EP | 2 113 738 A2 | 11/2009 | |
| EP | 2899492 A1 * | 7/2015 | ............. F41H 5/266 |
| GB | 685725 A | 1/1953 | |
| GB | 777764 A | 6/1957 | |
| GB | 2489741 A * | 10/2012 | ............. F41H 5/266 |
| WO | 2010/066220 A1 | 6/2010 | |

OTHER PUBLICATIONS

English translation of specification of EP0908752.*
English translation of specification of DE102008061701.*
International Search Report and Written Opinion for corresponding Patent Application No. PCT/GB2014/053217 dated Jan. 29, 2015.
Combined Search and Examination Report for corresponding Patent Application No. GB 1319089.7 dated Apr. 1, 2014.

* cited by examiner

PERISCOPE WITH A REFLECTOR FORMING A LIGHT TIGHT SEAL

This application is a national phase of International Application No. PCT/GB2014/053217 filed Oct. 29, 2014 and published in the English language.

This invention relates to a periscope.

BACKGROUND

Periscopes are used in a number of military applications to provide the occupants of a vehicle, such as a tank, with a view of the outside environment. In addition to the optical view from the periscope, such military vehicles are often also equipped with cameras that may provide digitally enhanced views of the outside environment, for example night vision or thermal imaging. There is also other information that may be presented on screens, for example speed or position. It would be desirable to provide a periscope in which the user could switch between views, including an external optical view and an electronically generated display without changing the viewing position. Such a periscope system is desirably relatively compact in order to allow retrofitting into existing vehicles without affecting the comfort or ease of exit of the user.

It is also desirable that the periscope system does not reveal the position of the vehicle by transmission of ambient light from the interior of the vehicle to the outside world. Similarly, light from the outside world may wash out other displays desirably observed within the vehicle under low internal lighting conditions.

BRIEF SUMMARY OF THE DISCLOSURE

In accordance with the present invention there is provided a periscope comprising an object window, a first reflector, a second reflector and an intermediate port between the first reflector and the second reflector. The first reflector is arranged to reflect light from the object window towards the second reflector through the intermediate port. The second reflector is selectively movable between a first position of use in which the second reflector reflects light from the first reflector towards a viewing position and a second position of use in which the second reflector closes the intermediate port.

Thus, the second reflector of the present invention acts selectively to direct an image from the object window to the user or to close off the intermediate port so that light from the viewing position does not escape through the object window. This provides a simple and potentially compact periscope design.

In the second position of use, the second reflector preferably forms a light tight seal to close the intermediate port. The light tight seal may be formed by a resilient member, such as an elastomer sealing ring, provided between a periphery of the intermediate port and the second reflector.

Typically, the second reflector is pivotable between the first position of use and the second position of use about a pivot axis. The pivot axis may be located at an edge of the second reflector. The second reflector may be pivotable through an angle of less than 90 degrees, typically through an angle of less than 60 degrees. In embodiments of the invention, the angle is substantially 45 degrees.

The periscope may further comprise an electronic display device. In the first position of use the second reflector may be interposed between electronic display and the viewing position. In the second position of use the view of the electronic display device from the viewing position may be unobstructed by the second reflector. Thus, in this case, the second reflector moves out of the way of the electronic display device in the second position of use. In this way, the viewing position does not need to change in order to view either the external image from object window or the electronic display device.

In one embodiment, the electronic display device is mounted to the second reflector for movement therewith between the first position of use and the second position of use. In this way, movement of the second reflector from the first position of use into the second position of use also moves the electronic display device. In the second position of use the electronic display device is viewable from the viewing position.

Typically, the second reflector comprises a mirror. The second reflector may be biased into the first position of use by a spring mechanism. The second reflector may be biased into the second position of use by a spring mechanism. For example, an over centre spring mechanism may be used to bias the second reflector into each position of use. Alternatively, or in addition the second reflector may be retained in the first and/or second position of use by a locking mechanism.

BRIEF DESCRIPTION OF THE DRAWINGS

Embodiments of the invention are further described hereinafter with reference to the accompanying drawings, in which.

DETAILED DESCRIPTION

Figure 1:
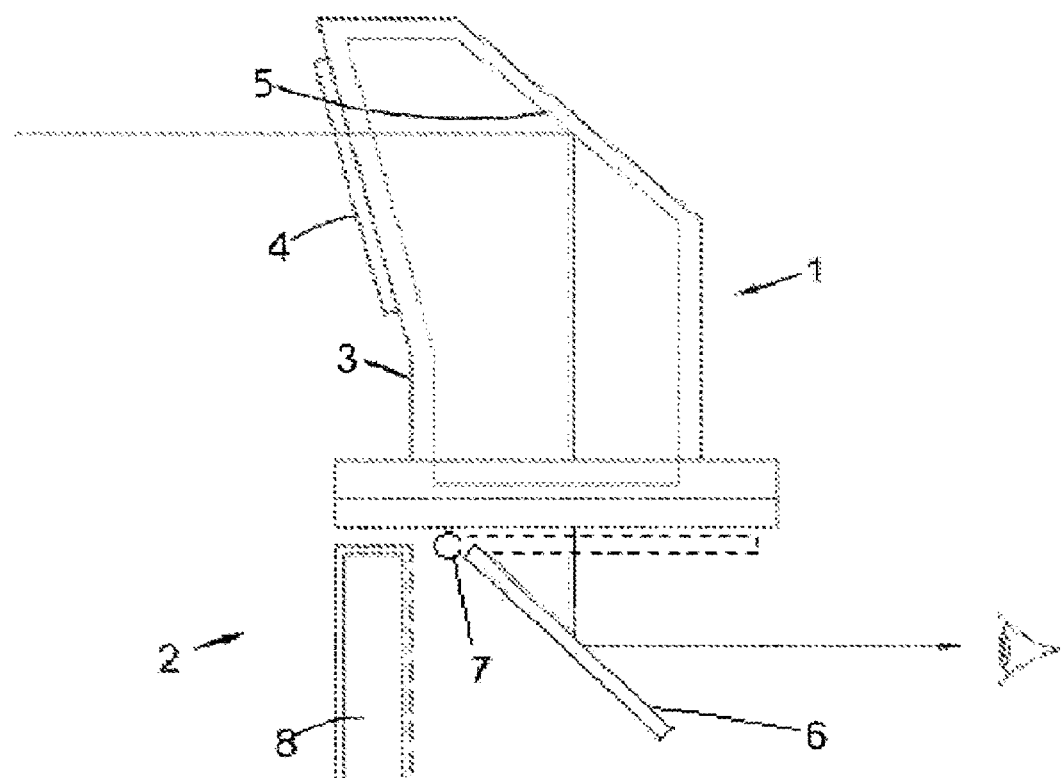
FIG. 1 is a schematic diagram of a periscope according to an embodiment of the invention.

FIG. 1 is a sectional view of a periscope according to an embodiment of the invention. The periscope comprises an upper section 1 connected to a lower section 2. The upper section 1 comprises a housing 3 provided with a transparent window 4. Within the upper section 1, a mirrored surface 5 at an acute angle to the plane of the window 4 reflects light from the window 4 into the lower section 2.

Figure 3:
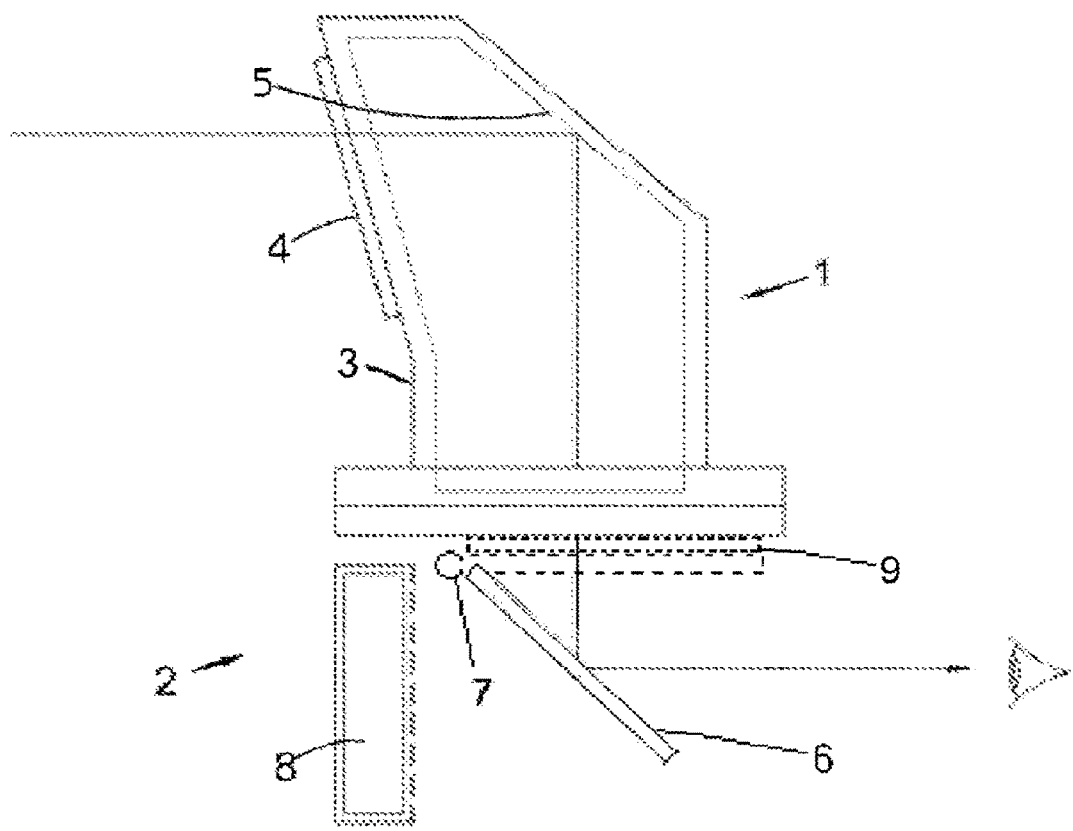
FIG. 3 is a schematic diagram of a periscope including a sealing ring according to another embodiment of the invention.

The lower section 2 comprises a pivotable mirror 6 which is mounted for rotation about an axis 7 provided at one edge of the mirror 6. The pivotable mirror 6 is mirrored on its upper surface and is biased by a spring mechanism into two stable positions, represented in solid and phantom lines in FIG. 1. In the first stable position of the rotatable mirror 6, shown in solid lines in FIG. 1, light from the upper section 1 of the periscope is reflected by the mirror 6 towards the viewer. In the second stable position of the mirror 6, shown in phantom lines in FIG. 1, the mirror 6 closes off the optical path from the upper section 1 of the periscope and forms a light-tight seal. A sealing ring 9 (represented schematically by dashed lines in FIG. 3) may be provided at the base of the upper section 1 to engage the mirror 6 and form the seal.

The lower section 2 further comprises a cassette module 8 comprising an electronic display, such as a VGA display, which is visible to the viewer when the pivotable mirror 6 is in the second stable position. The cassette module 8 is removably mounted to the lower section 2 of the periscope for easy replacement. This ensures that the principal electronic components of the periscope can simply be replaced in the event of a malfunction. The connection between the cassette module 8 and the lower section 2 of the periscope includes asymmetrically arranged mating formations, such as pegs and sockets, to ensure that the cassette module 8 and hence the display is located in the correct orientation on the lower section 2. The VGA display is configured to show electronically generated digital images, such as night vision images, from outside the vehicle in which the periscope is mounted. Other electronically generated images may be displayed.

The axis of rotation 7 of the pivotable mirror 6 is substantially perpendicular to the optical axis of the periscope. It will be seen from FIG. 1 that in the second stable position the pivotable mirror 6 blocks the optical path between the upper section 1 and the lower section 2. In this way, the mirror 6 prevents light from the VGA display 8 escaping through the transparent window 4. This is important for military operations, particularly at night, where there is a risk that any escaping light could give away the position of the periscope and hence the user.

Figure 2:
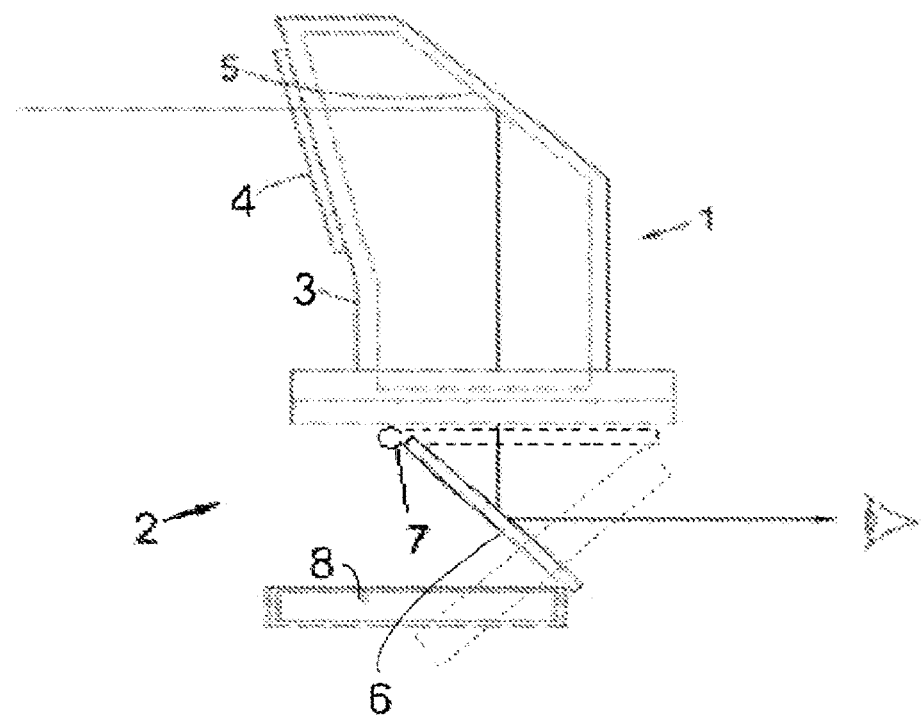
FIG. 2 is a schematic diagram of a periscope according to a further embodiment of the invention.

FIG. 2 is a schematic diagram of a periscope according to a further embodiment of the invention. The same reference numerals are used in FIG. 2 for the components that correspond to the embodiment of FIG. 1 and the description of these components will not be repeated.

The embodiment of FIG. 2 differs from that of FIG. 1 in that the cassette module 8 comprising the electronic display is mounted to the pivotable mirror 6 for pivotal movement therewith. The two stable positions of the mirror 6 and the display 8 are represented in solid and phantom lines in FIG. 2. In the first stable position of the rotatable mirror 6, shown in solid lines in FIG. 2, light from the upper section 1 of the periscope is reflected by the mirror 6 towards the viewer. In the second stable position of the mirror 6, shown in phantom lines in FIG. 1, the mirror 6 closes off the optical path from the upper section 1 of the periscope and forms a light-tight seal. In the second stable position, cassette module 8 is tilted towards the viewer who is then able to view the display (indicated by dashed lines). The pivotable mirror 6 and the cassette module 8 are retained in the first or second stable position by a locking mechanism (not shown). The locking mechanism comprises user-actuable levers which allow the user to lock the pivotable mirror 6 and the cassette module 8 in the first or the second stable position.

In summary, a periscope comprises an object window 4, a first reflector 5, a second reflector 6; and an intermediate port between the first reflector 5 and the second reflector 6. The first reflector 5 is arranged to reflect light from the object window 4 towards the second reflector 6 through the intermediate port. The second reflector 6 is selectively movable between a first position of use in which the second reflector 6 reflects light from the first reflector 5 towards a viewing position and a second position of use in which the second reflector 6 closes the intermediate port.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A periscope comprising:
    an object window;
    a first reflector;
    a second reflector; and
    an intermediate port between the first reflector and the second reflector,
    wherein the first reflector is arranged to reflect light from the object window towards the second reflector through the intermediate port; and
    the second reflector is selectively movable between a first position of use in which the second reflector reflects light from the first reflector towards a viewing position and a second position of use in which the second reflector closes the intermediate port,
    wherein in the second position of use, the second reflector forms a light tight seal to close the intermediate port, and
    wherein the light tight seal is effected by a sealing ring.

2. A periscope system as claimed in claim 1, wherein the sealing ring is a resilient member provided between a periphery of the intermediate port and the second reflector.

3. A periscope as claimed in claim 1, wherein the second reflector is pivotable between the first position of use and the second position of use about a pivot axis.

4. A periscope as claimed in claim 3, wherein the pivot axis is located at an edge of the second reflector.

5. A periscope as claimed in claim 3, wherein the second reflector is pivotable through an angle of less than 90 degrees.

6. A periscope as claimed in claim 1, further comprising an electronic display device, wherein in the first position of use the second reflector is interposed between the electronic display device and the viewing position, and in the second position of use a view of the electronic display device from the viewing position is unobstructed by the second reflector.

7. A periscope as claimed in claim 6, wherein the electronic display device is mounted to the second reflector for movement therewith between the first position of use and the second position of use.

8. A periscope as claimed in claim 1, wherein the second reflector comprises a mirror.

9. A periscope as claimed in claim 1, wherein the second reflector is biased into the first position of use by a spring mechanism.

10. A periscope as claimed in claim 1, wherein the second reflector is biased into the second position of use by a spring mechanism.

11. A periscope as claimed in claim 1, wherein the second reflector is retained in the first position of use by a locking mechanism.

12. A periscope as claimed in claim 1, wherein the second reflector is retained in the second position of use by a locking mechanism.

13. A periscope as claimed in claim 1, wherein the sealing ring is an elastomer seal.

14. A periscope comprising:
an object window;
a first reflector;
a second reflector;
an electronic display device; and
an intermediate port between the first reflector and the second reflector,
wherein the first reflector is arranged to reflect light from the object window towards the second reflector through the intermediate port; and
the second reflector is selectively movable between a first position of use in which the second reflector reflects light from the first reflector towards a viewing position and a second position of use in which the second reflector closes the intermediate port,
wherein in the second position of use, the second reflector forms a light tight seal to close the intermediate port,
wherein in the first position of use the second reflector is interposed between the electronic display device and the viewing position, and in the second position of use a view of the electronic display device from the viewing position is unobstructed by the second reflector, and
wherein the electronic display device is mounted to the second reflector for movement therewith between the first position of use and the second position of use.

* * * * *